United States Patent
Sayers

(10) Patent No.: US 7,546,090 B2
(45) Date of Patent: Jun. 9, 2009

(54) METHOD TO REDUCE POWER CONSUMPTION IN A RADIO COMMUNICATION SYSTEM AND APPARATUS THEREFOR

(75) Inventor: Anthony David Sayers, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 24 days.

(21) Appl. No.: 10/506,275

(22) PCT Filed: Feb. 5, 2003

(86) PCT No.: PCT/IB03/00384

§ 371 (c)(1),
(2), (4) Date: Aug. 31, 2004

(87) PCT Pub. No.: WO03/075586

PCT Pub. Date: Sep. 12, 2003

(65) Prior Publication Data

US 2005/0096101 A1    May 5, 2005

(30) Foreign Application Priority Data

Mar. 6, 2002    (GB) ................... 0205236.3

(51) Int. Cl.
*H04B 1/44* (2006.01)
(52) U.S. Cl. .............. 455/78; 455/343.4; 455/502; 370/504; 375/356; 375/358
(58) Field of Classification Search ........... 455/78, 455/574, 343.4, 502; 375/219, 356, 358; 370/504
See application file for complete search history.

(56) References Cited

U.S. PATENT DOCUMENTS

| | | | | |
|---|---|---|---|---|
| 5,636,243 A * | 6/1997 | Tanaka | ................. | 375/219 |
| 5,881,055 A * | 3/1999 | Kondo | ................. | 370/311 |
| 2003/0142648 A1* | 7/2003 | Semper | ................. | 370/331 |

* cited by examiner

*Primary Examiner*—Nay A Maung
*Assistant Examiner*—Tuan H Nguyen

(57) ABSTRACT

A slave radio station establishes communization with a master radio station by transmitting a signal intermittently, listening for a response, and saving power by deactivating its transmitter and receiver at other times. When the master radio station responds, the slave station may synchronize periods of receiver activation with a beacon signal transmitted periodically by the master station and may cease transmission of the intermittent signal.

21 Claims, 5 Drawing Sheets

METHOD TO REDUCE POWER CONSUMPTION IN A RADIO COMMUNICATION SYSTEM AND APPARATUS THEREFOR

TECHNICAL FIELD

The invention relates to radio networks and apparatus for radio networks, and in particular, but not exclusively, to networks comprising a master radio station and one or more low power slave radio stations.

BACKGROUND ART

A radio network will commonly comprise a master radio station and one or more slave radio stations. The slave stations communicate with the master station directly, and may communicate with each other indirectly by means of messages passed via the master station.

In many applications there is a requirement for the slave stations to be powered by battery and therefore there is a requirement for low power consumption in order to maximize the battery life.

In many applications the slave stations, and possibly the master stations, will be mobile, such that the composition of networks is temporary. Therefore there is a requirement for networks to be configured dynamically, with slave stations establishing communication with different masters stations, and vice versa, as the radio stations change location.

The operation of low power master-slave networks is generally as follows. A master station transmits a beacon signal periodically. Messages for slave stations are transmitted by the master station after the beacon signal. Slave stations detect the beacon signal and adopt a power economy scheme synchronized to the beacon signal whereby the slave station activates its receiver when the beacon signal is due to be transmitted, checks whether there is a message to be received, if there is a message to be received the receiver remains active for the duration of the message, and then the slave deactivates its receiver to save power until the next beacon signal is due.

In order to operate in the manner described above, there must be a method by which a slave station can join a new network that it moves within range of by establishing initial communication with the new master station and becoming synchronized to the new network's beacon signal. The method used in prior art systems to establish initial communication and to synchronize is typically as follows.

Referring to FIG. 1, the master station transmits (Tx) a beacon signal B of duration $t_B$ at intervals $T_B$. Following each beacon signal is a period when the master station can receive (Rx) signals transmitted by slave stations. A slave station that is not synchronized with the master station samples the radio channel looking for a beacon signal. In order to ensure that the sampling encompasses a beacon signal, the sampling duration $t_S$ is a minimum of $T_B + t_B$ as illustrated in FIG. 1 at C. The sampling interval is $T_S$. In the scenario of FIG. 1, the slave station is out of radio range of the master station and so cannot receive the beacon signal at C. However, the slave station subsequently moves within range of the master station and during the following sampling activity at D detects the beacon signal. Having detected the beacon signal the slave station transmits a signal at E to identify itself to the master station and the master station acknowledges at F. Having detected a beacon signal the slave station activates its receiver synchronously with the beacon signal at G and may receive messages from the master station. When the slave station is sampling the radio channel to detect a beacon signal, its receiver duty cycle is $t_S/T_S = (T_B + t_B)/T_S$. As a typical example, $T_B = 15$ ms, $t_B = 0.32$ ms and $T_S = 1$ s, in which case the receiver duty cycle during sampling is 1/65. When the slave station has synchronized with a beacon signal its receiver duty cycle is $t_B/T_B$, which for the example is 1/47. If the receiver power consumption is $P_{Rx}$ when the receiver is active, the average power consumption is $P_{Rx} \cdot (T_B + t_B)/T_S$ during sampling and $P_{Rx} \cdot t_B/T_B$ when synchronized.

DISCLOSURE OF INVENTION

It is an object of the present invention to improve power economy in radio networks and apparatus for radio networks.

According to one aspect of the invention there is provided a method of establishing communication between a primary radio transceiver station and a secondary radio transceiver station, comprising at the primary station monitoring for a received first signal substantially continuously while not transmitting and transmitting a response signal in response to receiving the first signal, and at the secondary station operating a power economy mode in which the transmitter and receiver portions of the secondary station are inactive, activating intermittently the transmitter to transmit the first signal and activating intermittently the receiver to receive the response to the first signal.

The initial communication between a master (primary) station and a slave (secondary) station joining the network is a signal transmitted from the slave station to the master station. This is in contrast to the prior art in which the initial communication is a signal, namely the beacon signal, transmitted from the master station and received by the slave station. By reversing the direction of initial communication in this way, the responsibility for receiving the initial communication is transferred from the slave station to the master station and therefore the slave station need not sample the radio channel to detect a beacon signal. This reversal is possible because the master station has a supply of power adequate to enable its receiver to remain activated substantially continuously when the master station is not transmitting. It is shown below that the power consumed by the slave station making an intermittent transmission can be less than the power the slave station would consume performing periodic channel sampling to detect a beacon signal.

According to a second aspect of the invention there is provided a radio system comprising a primary station and a secondary station, the primary station comprising a primary station transmitter, primary station receiver, the primary station receiver being activated substantially continuously while the primary station transmitter is not activated, and means responsive to receiving a first signal for activating the primary station transmitter to transmit a response signal, and the secondary station comprising a secondary station transmitter, a secondary station receiver, means for operating a power economy mode in which the secondary station transmitter and secondary station receiver are inactive, means for activating intermittently the secondary station transmitter to transmit the first signal and for activating intermittently the secondary station receiver to receive the response to the first signal.

According to a third aspect of the invention there is provided a radio station comprising a transmitter, a receiver, means for operating a power economy mode in which the transmitter and receiver are inactive, means for activating intermittently the transmitter to transmit a first signal and activating intermittently the receiver to receive a response from another radio station to the first signal, and means responsive to receiving a response signal for establishing periodic activation of the receiver synchronized with a periodic signal received from the another radio station.

According to a fourth aspect of the invention there is provided an integrated circuit comprising the radio station in accordance with the third aspect of the invention.

BRIEF DESCRIPTION OF DRAWINGS

The invention will now be described, by way of example only, with reference to the accompanying drawings wherein.

MODES FOR CARRYING OUT THE INVENTION

Figure 1:
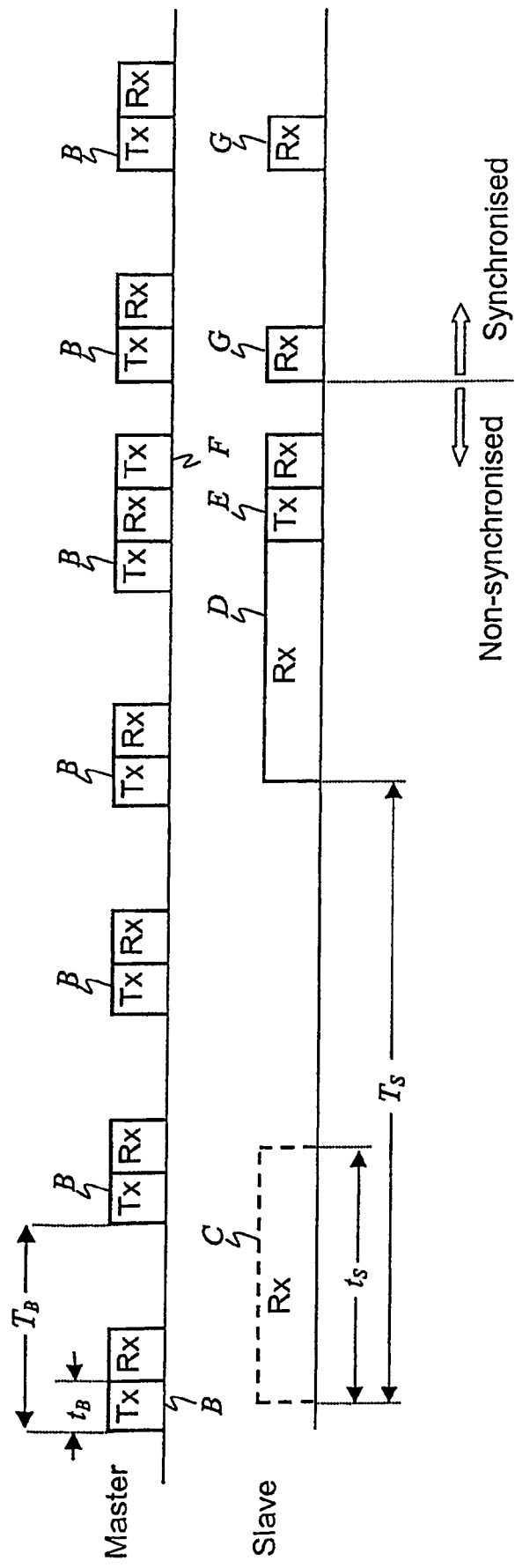
FIG. 1 is a timing diagram illustrating the operation of a prior art radio network.
Figure 2:
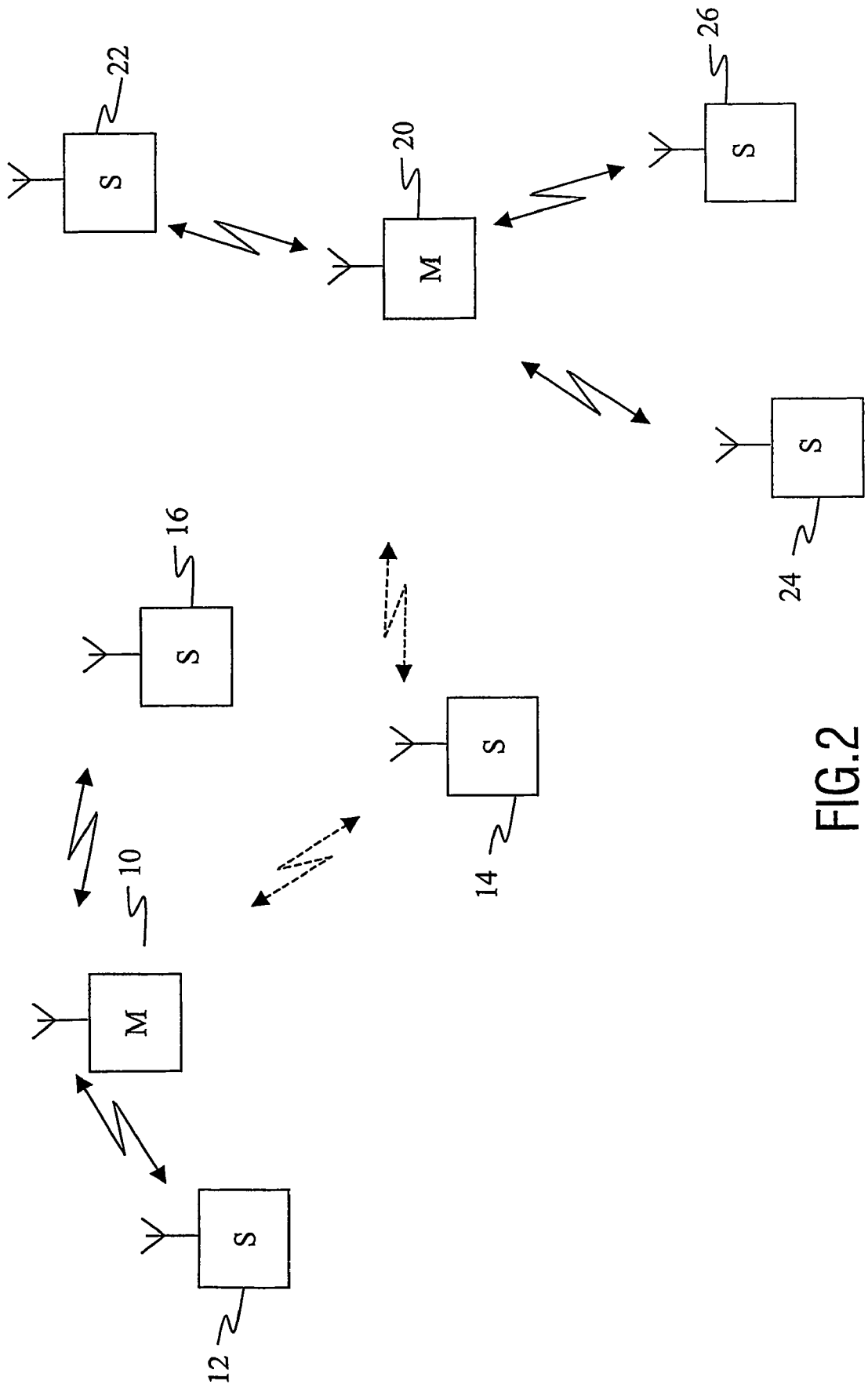
FIG. 2 illustrates two radio networks.

Referring to FIG. 2, there is illustrated a first radio network comprising a first master station 10 and slaves stations 12, 14 and 16, and a second radio network comprising a second master station 20 and slaves 22, 24 and 26. The first master station 10 can communicate directly with slaves stations 12, 14 and 16, and the slaves stations 12, 14 and 16 can communicate with each other by means of messages forwarded by the first master station 10. Similarly, the second master station 20 can communicate directly with slaves stations 22, 24 and 26, and the slaves stations 22, 24 and 26 can communicate with each other by means of messages forwarded by the second master station 20. In FIG. 2 the master stations 10, 20 are labeled M and the slave stations 12, 14, 16, 22, 24, 26 are labeled S. Each master station 10, 20 transmits periodically a beacon signal identifying their respective network. Slave station 14 is mobile and is receiving a poor quality signal from the first master station 10. It has moved within radio range of the second master station 20 and requires to join the second network. The process for joining the second network is described below with reference to FIG. 5.

Figure 3:
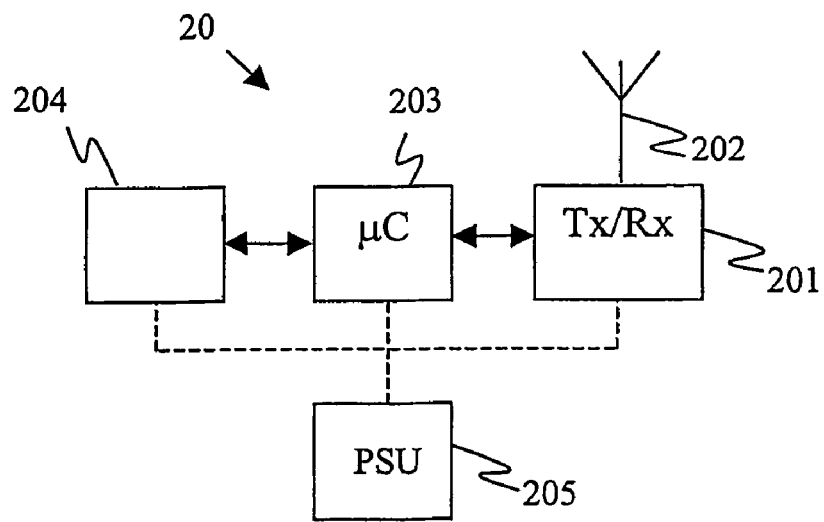
FIG. 3 is a block schematic diagram of a master station.

Referring to FIG. 3, each master station (10 or 20) comprises a half-duplex transceiver 201 coupled to an antenna 202 for transmission and reception of signals. Coupled to the transceiver 201 there is a master processor 203 which generates beacon signals and acknowledgement signals for transmission, and processes received signals. Coupled to the master processor 203 there is a master application 204 which generates application messages for transmission and to which relevant application messages received off-air are delivered by the master processor 203. Power for the transceiver 202, master processor 203 and master application 204 is supplied by a power supply unit (PSU) 205, and this power may be derived from the mains supply. An example of a master application 204 is a desk-top personal computer which transfers emails by means of the master processor 203 and master transceiver 201 to and from a personal digital assistant (PDA) when the PDA comes within radio range. Another example of a master application 204 is a supermarket information server which transfers customer information to a shopper's trolley equipped with a display when the trolley passes near the transceiver 201. A further example of a master application 204 is a freight container tracking station which registers and reports the presence of a container passing nearby.

Figure 4:
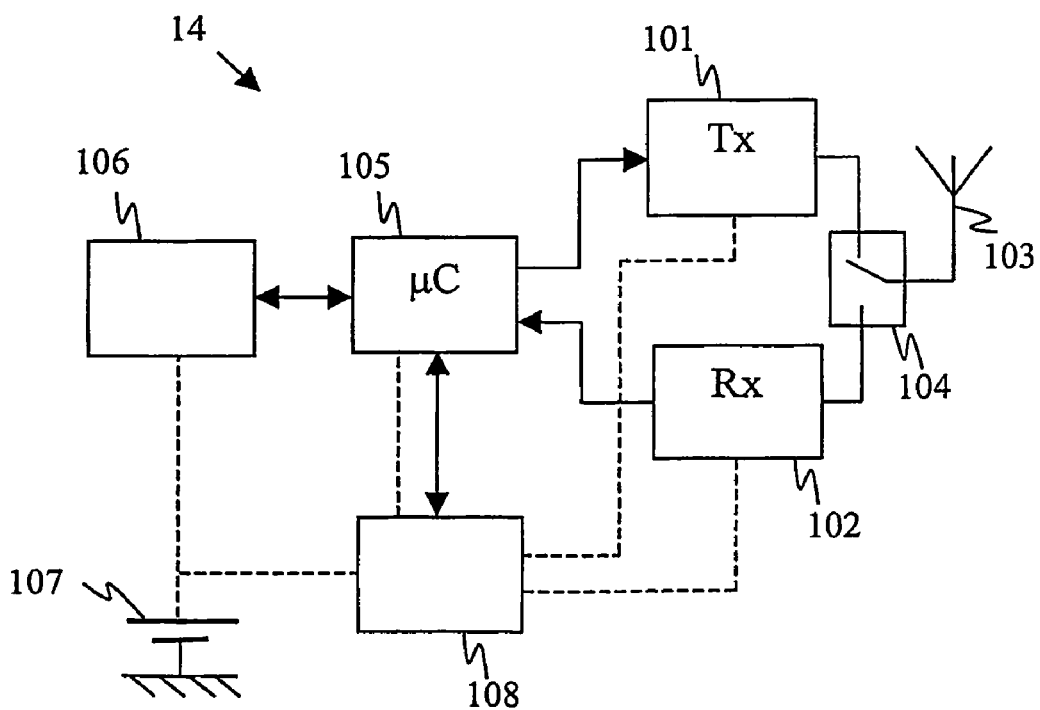
FIG. 4 is a block schematic diagram of a slave station.

Referring to FIG. 4, the slave station 14 comprises a transmitter 101 and receiver 102 coupled to an antenna 103 by means of a changeover switch 104. Coupled to the transmitter 101 and receiver 102 there is a slave processor 105 which generates identification signals for transmission, and processes received signals. Coupled to the slave processor 105 there is a slave application 106 which generates application messages for transmission and to which relevant application messages received off-air are delivered by the slave processor 105. Power for the transmitter 101, receiver 102 and slave processor 105 is supplied by a power control unit 108 which is equipped to activate and deactivate each of these units for the purpose of power economy. Power is delivered to the power control unit 108 from a battery 107, which also supplies power to the slave application 106 directly. Optionally the slave application 106 may operate power economy, either internally or by receiving power from the power control unit 108. An example of a slave application 106 is a PDA which can transfer emails by means of the slave processor 105, transmitter 101 and receiver 102 to and from a desk-top personal computer, as described above. Another example of a slave application 106 is display-equipped shopper's trolley that can display information received from a supermarket information server when the trolley passes near the transceiver 201, as described above. A further example of a slave application 106 is a freight container that can report details such as identity and load specification to a freight container tracking station as it passes nearby, as described above.

Figure 5:
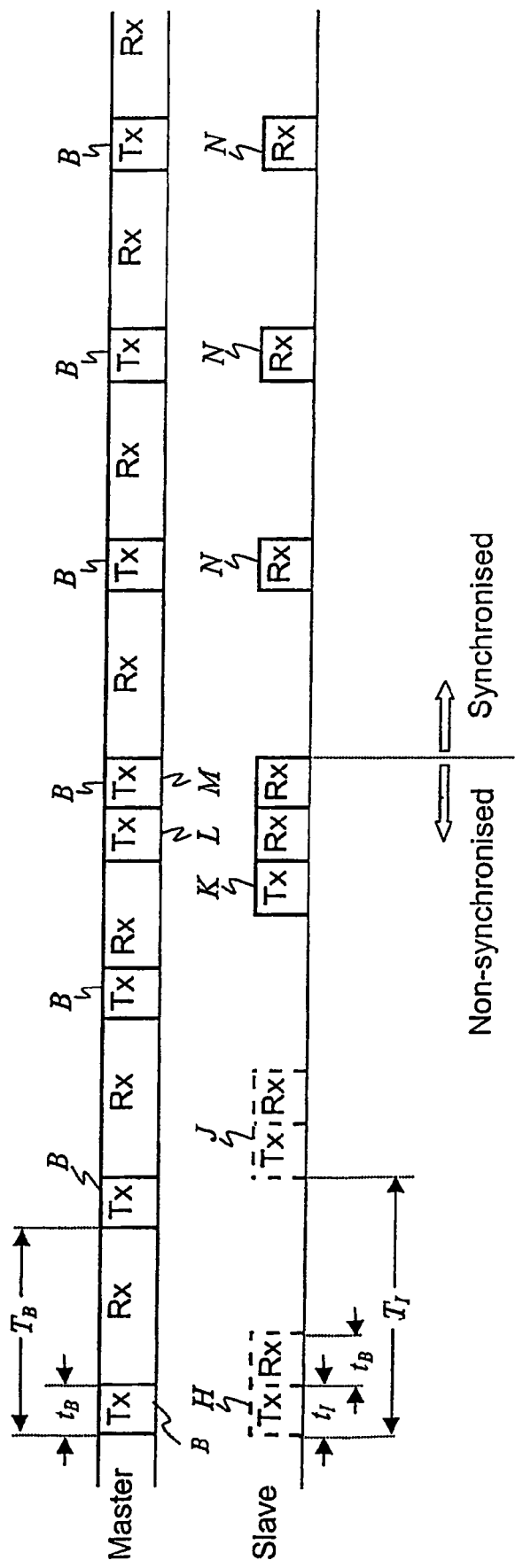
FIG. 5 is a timing diagram illustrating the operation of a radio network.

Referring to FIG. 5, the second master station 20 transmits a beacon signal periodically, referenced as B in FIG. 5, at intervals $T_B$. When not transmitting the beacon signal, and not having any messages to transmit to slave stations, the second master station's transceiver 201 monitors the radio channel for received signals. The slave station 14, when it determines that it should search for a new network to join, for example when radio communication with the first master station 10 degrades or is lost, activates its transmitter 101 and transmits an identification signal intermittently, referenced as H, J and K in FIG. 5, at intervals $T_I$. After transmitting each identification signal the slave station 14 activates its receiver 102 to listen for a response from a master station. At other times the power control unit 108 may deactivate the transmitter 101, receiver 102 and slave processor 105 to conserve power. In FIG. 5, identification signal H is not received by the second master station 20 because the slave station 14 is not within radio range, and also because the second master station 20 is not in a receive mode at the time that the identification signal H is transmitted. The following identification signal J is not received by the second master station 20 because the slave station 14 is not within radio range, even though the second master station 20 is now in a receive mode at the time that the identification signal J is transmitted, because the second master station operates with a beacon signal interval $T_B \neq T_I$. The following identification signal K is received by the second master station 20 because the slave station 14 has now moved within radio range. The second master station 20 acknowledges receipt of the identification signal K by transmitting an acknowledgement signal, referenced as L in FIG. 5. Having established communication with the second master station 20 and received a confirmatory acknowledgement signal, the slave station 14 activates its receiver 102 in order to receive the next beacon signal transmitted by the second master station 20. This next beacon signal is referenced at M in FIG. 5. Having received this beacon signal the slave station 14 ceases to transmit the identification signal intermittently and activates its receiver 102 synchronously with the beacon signal, referenced as N in FIG. 5.

The receiver power consumption of the slave station 14 is $P_{Rx}$ when the receiver 104 is active and the transmitter power consumption is $P_{Tx}$ when the transmitter 101 is active. Therefore the average power consumption of the slave station 14 is $(P_{Tx}t_I+P_{Rx}t_B)/T_I$ when non-synchronized and $P_{Rx}t_B/T_B$ when synchronized. The benefit of the present invention over the prior art may be seen by calculating the ratio η of the average power consumption when operating according to the present invention and when operating according to the prior art, i.e.

$$\eta = \frac{(P_{Tx}t_I + P_{Rx}t_B)/T_I}{P_{Rx}(t_B + T_B)/T_S}.$$

For a similar latency in both schemes we set $T_I=T_S$. For a typical low power radio network scenario, $P_{Tx}=0.5P_{Rx}$. Therefore, $$\eta = \frac{(0.5t_I + t_B)}{(t_B + T_B)}.$$

Typical values for the time parameters are $t_I=t_B=0.32$ ms, $T_B=15$ ms, in which case the benefit is η=1/32 i.e. average power consumption when non-synchronized is according to the invention a factor 32 lower than in the prior art.

Figure 6:
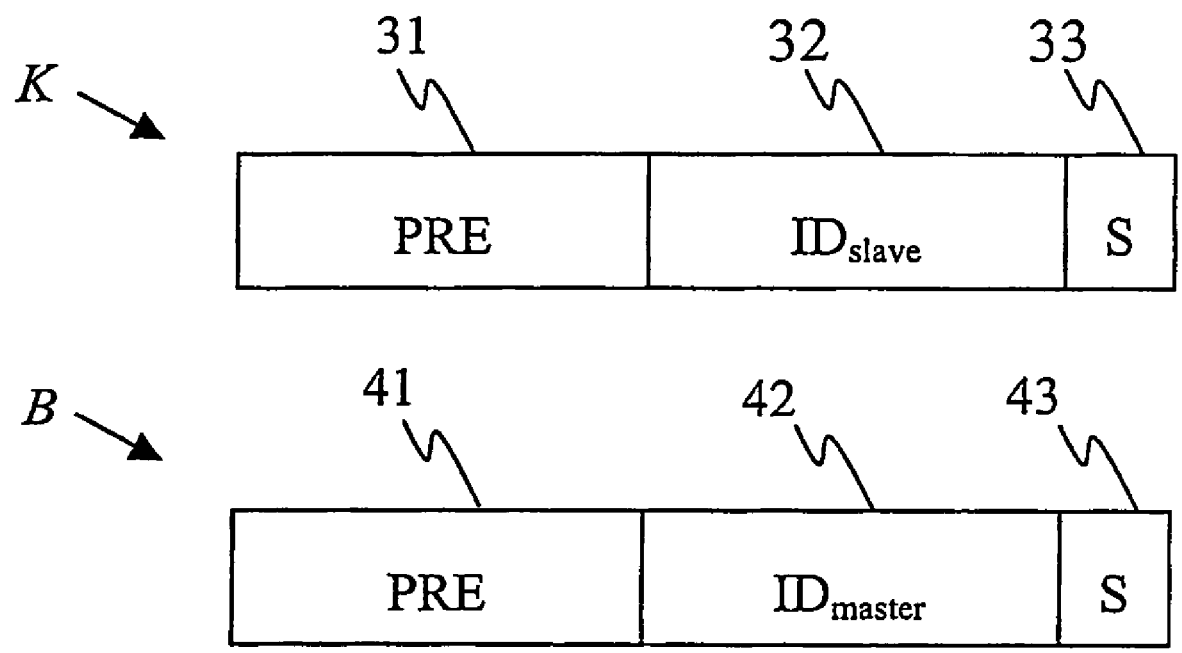
FIG. 6 illustrates the format of signals transmitted by a master station and by a slave station.

Referring to FIG. 6, the identification signal K (or equally H or J) transmitted intermittently by the slave station 14 when non-synchronized comprises a preamble of bit reversals 31 (PRE) to aid bit synchronization when the identification signal K is received at the second master station 20, the slave identity 32 ($ID_{slave}$) to identify the slave station 14 to the second master station 20, and a signal type indicator 33 (S) to identify the signal as an identification signal. The beacon signal B transmitted intermittently by the second master station 20 comprises a preamble of bit reversals 41 to aid bit synchronization when the beacon signal B is received at the slave station 14, the second master station identity 42 ($ID_{master}$) to identify the second master station 20 to the slave station 14, and a signal type indicator 43 (S) to identify the signal as a beacon signal B. The acknowledgement signal L transmitted by the second master station 20 has the same format as the beacon signal, except that the signal type indicator 43 (S) has a distinguishing value.

Optionally the acknowledgement signal L may contain information, such as timing data, to assist the slave station 14 to synchronize activation of its receiver 102 with the transmitted beacon signal B.

Optionally other formats may be used for the identification signal K, the beacon signal B, or the acknowledgement signal L. For example, the identification signal K and the acknowledgement signal L may be shortened by omitting the identities 32, 42, and these identities transmitted subsequently in additional signals only after initial communication has been established using the shortened identification signal K and the acknowledgement signal L, thereby enhancing power economy in the slave 14.

Optionally the slave station 14 need not activate its receiver 102 to receive every consecutive beacon signal B transmitted by the second master station 20, but receive merely a subset of the beacon signals, thereby enhancing power economy. In this case the interval between the periodic activations of the receiver 102 synchronized to the periodic beacon signal B transmitted by the second master station 20 is longer than the interval between successive transmissions of the periodic signal B.

Optionally the slave station 14 may continue to transmit the identification signal H, J, K intermittently even after it has established communication with the second master station 20, in order to establish communication with an additional master station. The slave station 14 may optionally participate in more than one network simultaneously.

Optionally, the second master station 20 may make no periodic transmission of the beacon signal B, in which case the slave station 14 continues to transmit the identification signal H, J, K intermittently even after it has established communication with the second master station 20, in order to maintain communication. In this case the second master station 20 continues to transmit acknowledgement signals L.

The transmission of the identification signal H, J, K intermittently by the slave station 14 is not limited to a predetermined interval but may be at a varying interval. For example, the interval may be varied according to the desired latency of the slave application 106 at different stages of operation.

The master application 106 and/or slave application 204 may be integral with the second master station 20 or slave station 14 respectively, as described above, or may be external and coupled to the master, respectively slave, by means of a suitable interface.

Optionally the second master station 20 may operate its transceiver 201 in a full duplex manner, thereby being able to receive even while transmitting.

Optionally the second master station 20 may cease the periodic transmission of the beacon signal B when no slave station is participating in the network of that master station.

INDUSTRIAL APPLICABILITY

Radio networks with low power slave ratio stations.

The invention claimed is:

1. A method of establishing communication between a primary radio transceiver station and a secondary radio transceiver station, comprising the acts of:
   at the primary station, transmitting a periodic signal during a first time interval, monitoring for a received first signal from the secondary station substantially continuously while not transmitting, and transmitting a response signal in response to receiving the first signal, and
   at the secondary station, operating a power economy mode in which the transmitter and receiver portions of the secondary station are inactive, activating intermittently the transmitter during a second time interval to transmit the first signal and activating intermittently the receiver during a third time interval to receive the response to the first signal;
   wherein when the primary station is a base station and the secondary station is a mobile station; and
   wherein the first time interval is not equal to the second time interval.

2. The method as claimed in claim 1, further comprising the act of at the secondary station establishing, in response to receiving the response signal, periodic activation of the receiver synchronized to the periodic signal transmitted by the primary station.

3. The method as claimed in claim 2, wherein an interval between the periodic activations of the secondary station receiver synchronized to the periodic signal transmitted by the primary station is longer than the interval between successive transmissions of the periodic signal.

4. The method as claimed in claim 2, further comprising at the secondary station, in response to receiving the response signal, discontinuing the intermittent transmissions of the first signal.

5. The method as claimed in claim 1, wherein an interval between the intermittent activations of the secondary station transmitter is predetermined.

6. The method of claim 1, wherein the first time interval is equal to the third time interval.

7. The method of claim 1, wherein the second time interval immediately follows the first time interval.

8. The method of claim 1, wherein after synchronization between the primary station and the secondary station, the primary station stops transmission of the periodic signal and the secondary stations continues to intermittently transmit the first signal.

9. A radio system comprising a primary station and a secondary station, the primary station comprising a primary station transmitter for transmitting a periodic signal during a first time interval, primary station receiver, means for activating the primary station receiver substantially continuously while the primary station transmitter is not activated, and means responsive to receiving a first signal from the secondary station for activating the primary station transmitter to transmit a response signal, and the secondary station comprising a secondary station transmitter, a secondary station receiver, means for operating a power economy mode in which the secondary station transmitter and secondary station receiver are inactive, means for activating intermittently the secondary station transmitter during a second time interval to transmit the first signal and for activating intermittently the secondary station receiver during a third time interval to receive the response to the first signal;
   wherein when the primary station is a base station and the secondary station is a mobile station; and
   wherein the first time interval is not equal to the second time interval.

10. The radio system as claimed in claim 9, wherein the secondary station further comprises means responsive to receiving the response signal for establishing periodic activation of the secondary station receiver synchronized to the periodic signal transmitted by the primary station.

11. The radio system as claimed in claim 10, wherein an interval between the periodic activations of the secondary station receiver synchronized to the periodic signal transmitted by the primary station is longer than the interval between successive transmissions of the periodic signal.

12. The radio system as claimed in claim 10, the secondary station further comprising means responsive to receiving the response signal for discontinuing the intermittent activation of the secondary station transmitter to transmit the first signal.

13. The radio system as claimed in claim 9, wherein an interval between the intermittent activations of the secondary station transmitter is predetermined.

14. The radio system of claim 9, wherein the first time interval is equal to the third time interval.

15. The radio system of claim 9, wherein the second time interval immediately follows the first time interval.

16. A radio station for communication with a further radio station that transmits a periodic signal during a first time interval, the radio station comprising a transmitter, a receiver, means for operating a power economy mode in which the transmitter and receiver are inactive, means for activating intermittently the transmitter during a second time interval to transmit a first signal and activating intermittently the receiver during a third time interval to receive a response from the further radio station to the first signal, and means responsive to receiving a response signal for establishing periodic activation of the receiver synchronized with a periodic signal received from the another radio station;
   wherein when the other station is a base station and the station is a mobile station; and
   wherein the first time interval is not equal to the second time interval.

17. The radio station as claimed in claim 16, wherein the intermittent activation of the transmitter to transmit the first signal is responsive to degradation, or loss, of a communication channel.

18. The radio station as claimed in claim 16, further comprising means responsive co receiving the response signal for discontinuing the intermittent activation of the transmitter to transmit the first signal.

19. The radio station as claimed in claim 16, wherein the interval between the intermittent activations of the transmitter is predetermined.

20. The radio station as claimed in claim 16, wherein the interval between the periodic activations of the receiver synchronized to the periodic signal received from the another radio station is longer than the interval between successive transmissions of the periodic signal.

21. The radio station of claim 16, wherein the radio station is disposed in an integrated circuit.

* * * * *